United States Patent

D'Alfonso et al.

[11] Patent Number: 5,841,491
[45] Date of Patent: Nov. 24, 1998

[54] FIBERSCOPE ENHANCEMENT SYSTEM

[75] Inventors: David A. D'Alfonso, Goleta; Jordan C. Christoff, Santa Barbara, both of Calif.

[73] Assignee: Envision Medical Corp., Goleta, Calif.

[21] Appl. No.: 687,086

[22] Filed: Jul. 23, 1996

Related U.S. Application Data

[63] Continuation of Ser. No. 458,437, Jun. 2, 1995, abandoned, which is a continuation of Ser. No. 136,663, Oct. 14, 1993, abandoned.

[51] Int. Cl.$^6$ ..................................... H04N 7/18
[52] U.S. Cl. ............................. 348/65; 600/101
[58] Field of Search .................. 348/61, 65–76; 356/73.1; 600/101, 109; H04N 7/18

[56] References Cited

U.S. PATENT DOCUMENTS

| | | | |
|---|---|---|---|
| 4,723,175 | 2/1988 | Ichinoi et al. | 348/607 |
| 4,760,839 | 8/1988 | Nagasaki . | |
| 4,931,867 | 6/1990 | Kikuchi . | |
| 4,969,034 | 11/1990 | Salvati . | |
| 4,977,450 | 12/1990 | Yokota . | |
| 4,984,286 | 1/1991 | Dolazza . | |
| 4,988,171 | 1/1991 | Yokota . | |
| 5,034,888 | 7/1991 | Uehara et al. . | |
| 5,058,977 | 10/1991 | Sorin . | |
| 5,068,909 | 11/1991 | Rutherford et al. . | |
| 5,079,633 | 1/1992 | Hagino et al. . | |
| 5,081,692 | 1/1992 | Kwon et al. . | |
| 5,105,269 | 4/1992 | Nakamura et al. . | |
| 5,105,274 | 4/1992 | Sakamoto | 348/607 |
| 5,121,208 | 6/1992 | Citta et al. | 348/607 |
| 5,144,399 | 9/1992 | Nakayama et al. . | |
| 5,144,414 | 9/1992 | Nishi et al. | 348/607 |
| 5,148,499 | 9/1992 | Matsumura . | |
| 5,150,214 | 9/1992 | Shin et al. . | |
| 5,249,064 | 9/1993 | Minakawa | 348/607 |
| 5,255,078 | 10/1993 | Gibson | 348/607 |
| 5,257,100 | 10/1993 | Hattori et al. | 348/65 |
| 5,278,638 | 1/1994 | Nakada et al. | 348/607 |
| 5,321,501 | 6/1994 | Swanson et al. | 356/73.1 |
| 5,392,067 | 2/1995 | Konno et al. | 348/65 |
| 5,485,203 | 1/1996 | Nakamura et al. | 348/70 |

OTHER PUBLICATIONS

Gonzalez, Rafael C., Woods, Richard E., *Digital Image Processing*, Addison–Wesley Publishing Co., Inc. 1992, pp. 228–229.

*Primary Examiner*—Richard Lee
*Attorney, Agent, or Firm*—Lyon & Lyon LLP

[57] ABSTRACT

A system for transmitting an image through the fiber bundle of an optical fiber endoscope is provided, characterized by an electronic filter for substantial removal of distortion such as that introduced by passage of the image through the bundle. The filter is configured with a variable characteristic such as cutoff frequency which can be matched to a predetermined parameter of the bundle such as the density of individual fibers. Thus, the filter can be easily modified to provide optimal performance if the fiber bundle is replaced or modified.

39 Claims, 3 Drawing Sheets

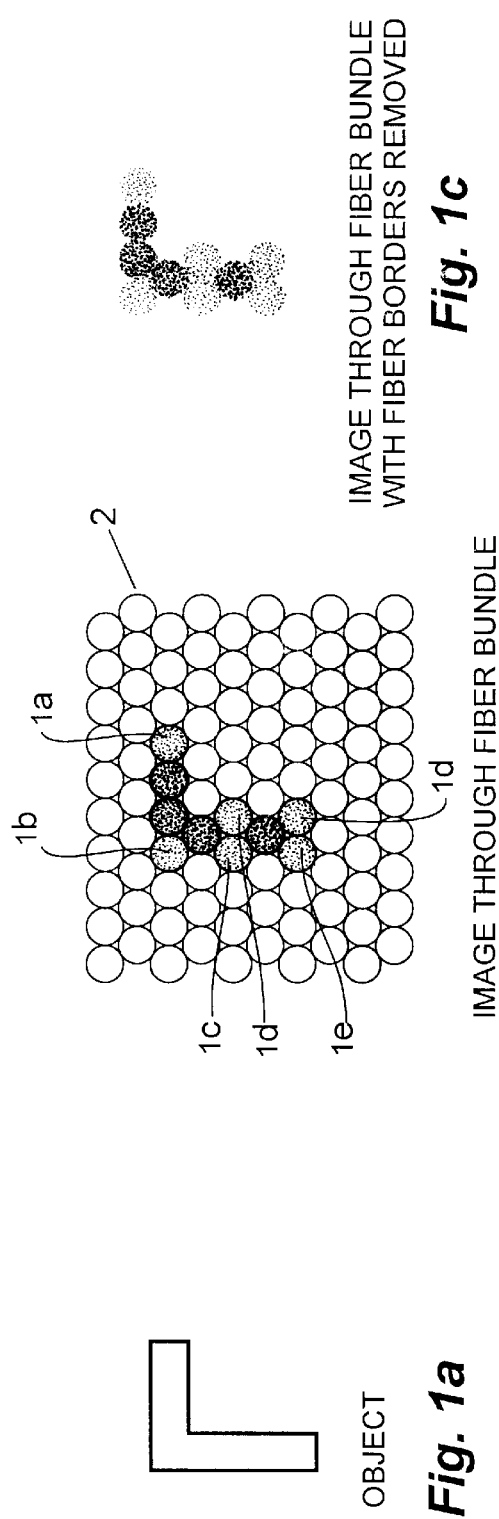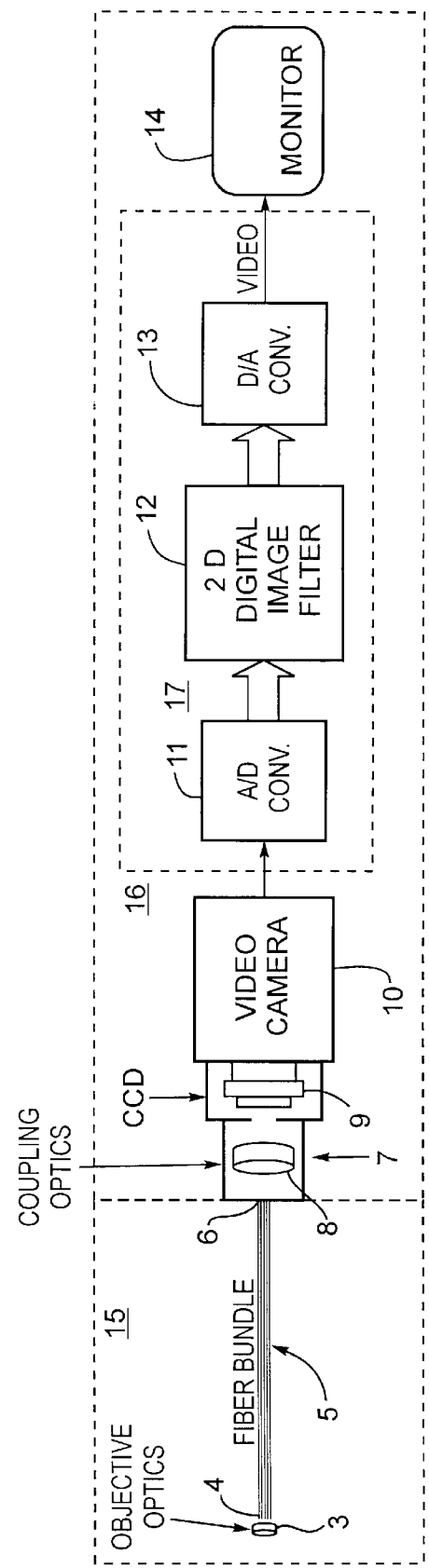

FIBERSCOPE ENHANCEMENT SYSTEM

This application is a continuation of application Ser. No. 08/458,437, filed Jun. 2, 1995, now abandoned, which is a continuation of application Ser. No. 08/136,663, filed Oct. 14, 1993 now abandoned.

BACKGROUND

1. Field of the Invention

This invention relates generally to the field of optical fiber endoscopes having an optical fiber bundle for transmitting an image from an insertion end to a video camera, and more specifically, to an image enhancement subsystem for use with such an endoscope for removing the high frequency distortion introduced by the individual fibers making up the optical fiber bundle.

2. Background of the Invention

Exploratory surgery is a known technique for gaining access to and viewing internal body organs and structures for the purpose of diagnosing a medical condition. However, it has several drawbacks: it is expensive, intrusive to the patient, and risky. Accordingly, medical devices known as endoscopes have become available to facilitate the diagnosis of medical conditions in a way that is less intrusive, less risky, and less costly to the patient.

These devices consist of an insertion end which is adapted for insertion into the human body for observation of internal body structures such as joints, the spinal column, fallopian tubes, and the vascular system, to name just a few. In a particular form of an endoscope known as an optical fiber endoscope, a fiber optic bundle is provided to transmit an image of the body structure being viewed to an eyepiece for viewing by a surgeon, or to a video camera for displaying the image on a monitor for viewing by third parties.

The fiber bundle provides flexibility and steerability to the device, enabling otherwise inaccessible structures to be viewed. However, the fiber bundle also introduces a distortion into the image typically in a honeycomb pattern. This distortion is caused by the spaces between the individual fibers as well as the individual fiber borders.

When the individual fibers are round, the spacing between the fibers, and hence the distortion which is introduced, are greatest. Although the spacing between the fibers can be reduced to some degree by utilizing non-round fibers, the distortion will still exist to some degree regardless of fiber shape.

Although, in practice, the endoscope eyepiece magnification can be adjusted to make the distortion less noticeable, this approach has the undesirable side effect of reducing the size of the image. Moreover, it has no effect on the image displayed to third parties on the monitor.

Optical elements or filters have also become available for reducing this distortion, as described in U.S. Pat. No. 4,760,839, Nagasaki, Aug. 2, 1988, which is hereby fully incorporated herein by reference as though set forth in full. Such filters have typically been used in endoscopes because of their low cost. However, these elements suffer from the disadvantage that their physical construction must be matched to a specific fiber bundle. Consequently, if a new fiber bundle is substituted for the original bundle, or if the characteristics of the original bundle change, then the optimal element may no longer effectively reduce the distortion. In addition, some filter characteristics which are necessary to effectively attenuate the distortion, such as a sharp cutoff, may simply not be attainable from such optical elements.

Another disadvantage is that the addition of optical elements in the image path reduces the light transmissivity of the system.

Consequently, it is an object of the subject invention to provide an image enhancement subsystem that reduces the distortion introduced by the fiber bundle while overcoming the disadvantages of the prior art.

SUMMARY OF THE INVENTION

In accordance with the purpose of the invention as broadly described herein, there is provided a system comprising:

an optical fiber bundle in a fiber optic endoscope, the bundle having a distal end and a proximal end, for transmitting an image from the distal end to the proximal end, whereupon the image, upon exiting the proximal end, is comprised of an object portion having a plurality of spatial frequency components and a distortion portion, also having a plurality of spatial frequency components;

an imaging means optically coupled to the proximal end of the fiber for producing a signal representative of the image;

output means;

a signal path for sending the signal to the output means;

an electronic filter situated along the signal path between the imaging means and the output means having a variable characteristic which is determined so that the filter substantially attenuates the spatial frequency components of the distortion portion while leaving the spatial frequency components of the object portion of the image substantially unattentuated.

A related method is also provided.

BRIEF DESCRIPTION OF THE DRAWINGS

FIGS. 1a–1c illustrate the limitations on the spatial frequency components of an image imposed by a fiber optic bundle as well as the distortion introduced by such a bundle;

FIG. 2 illustrates a block diagram of a system incorporating the teachings of the subject invention;

DESCRIPTION OF THE PREFERRED EMBODIMENT

Figure 3:
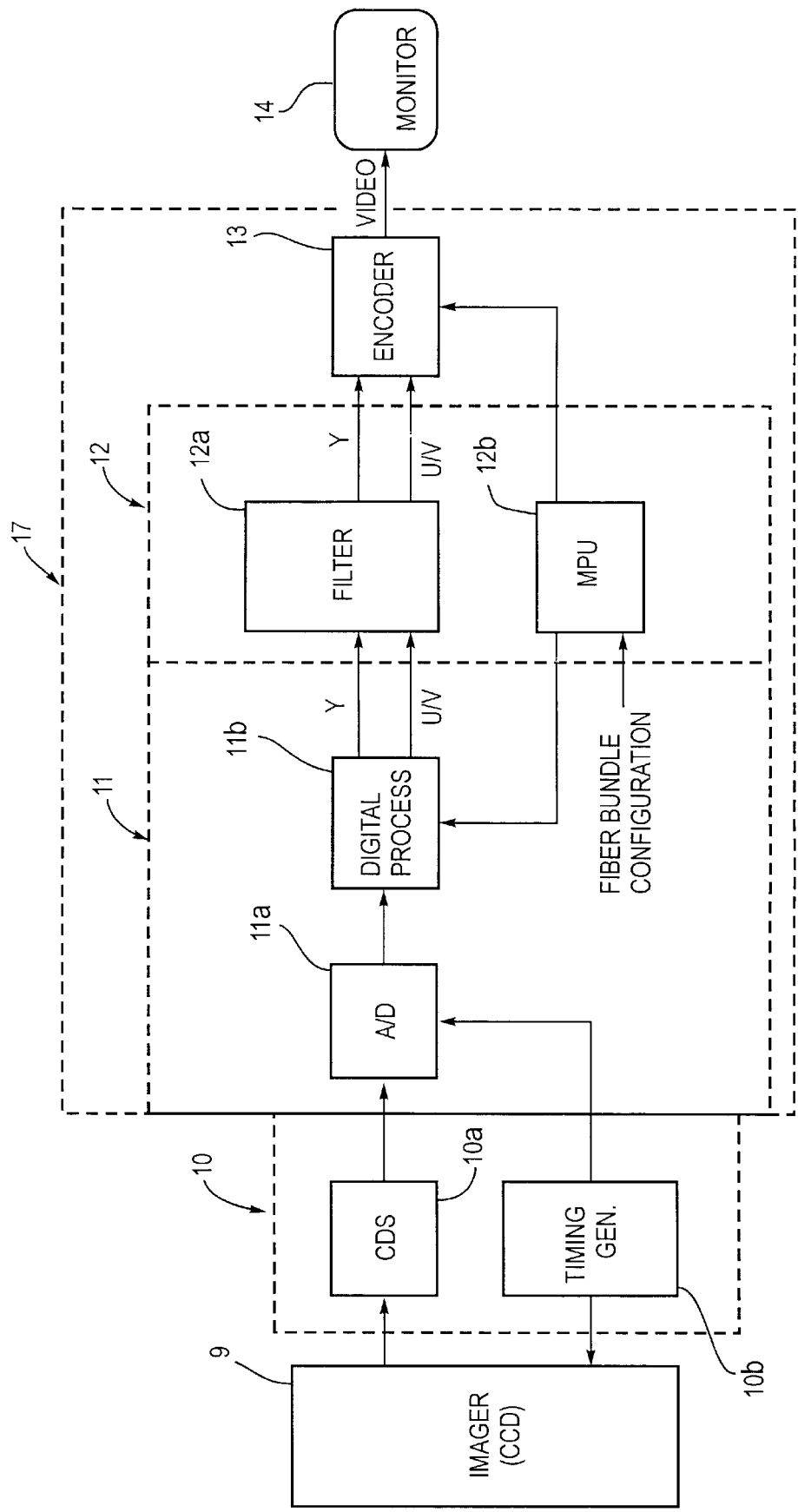
FIG. 3 illustrates a specific hardware implementation of a system incorporating the teachings of the subject invention.

The preferred embodiment takes advantage of the fact that the spatial frequency content of an image, which is a quantitative measurement of the amount of detail contained in the image, transmitted through a fiber bundle is limited by the bundle. This phenomenon can be illustrated with the aid of FIGS. 1a–1c. FIG. 1a illustrates an object which is to be imaged, while FIG. 1b illustrates the image of that object after being transmitted through a fiber bundle. As can be seen, the edges of the object transmitted through the fibers identified with reference numerals 1a–1f in FIG. 1b, are distorted. This is because the light from these edges has become randomly distributed over the cross-sectional surface area of the fibers used to transmit this light. Consequently, these edges have become blurred in the resultant image. This effect is more noticeable in FIG. 1c, which shows the image of FIG. 1b with the honeycomb distortion 2 introduced by the fiber bundle removed. In effect, the fiber bundle has removed high spatial frequency components, which manifest themselves as sharp edges, from the image. Thus, the fiber bundle limits the spatial frequency content of the image.

The honeycomb pattern typically introduced into the image by the fiber bundle is, by contrast, normally composed only of high frequency components. Thus, this distortion can be significantly eliminated without significant degradation of the image by passing the same through a low-pass filter which has a cutoff frequency high enough to allow significant passage of the frequencies making up the object image while low enough to prevent significant passage of the high frequency components making up the honeycomb distortion. Alternatively, as discussed later in this disclosure, alternative embodiments are possible using high pass, band pass, or band stop filters.

A block diagram of a system incorporating the subject invention is illustrated in FIG. 2. As illustrated, the system comprises optical fiber endoscope 15 coupled to video subsystem 16. The optical fiber endoscope 15, in turn, comprises fiber bundle 5 having a distal end 4 and a proximal end 6. The distal end 4 is part of an insertion section (not shown) which is inserted into the body for the purpose of viewing a body structure. Objective optics 3 are provided in proximity to the distal end 4 and function to couple an image of the object to the fiber bundle 5 through the distal end 4. Once coupled to the bundle, the image is transmitted through the length of the bundle.

The video subsystem 16 comprises an imaging means for capturing the image and producing a signal representative thereof. In this embodiment, the imaging means comprises a video camera 10 coupled to an imager 9, typically a CCD. However, it should be appreciated that other forms of imaging means are possible. For purposes of this disclosure, the term imaging means shall refer to any apparatus for capturing the image and producing a signal representative thereof. Such shall include means for capturing moving images, and means for capturing still images. Coupling optics 8 are also provided and arranged along an optical path extending from the proximal end 6 of the fiber bundle 5 to the imager 9 of the video camera. These optics function to couple the image, once it has exited from the proximal end 6 of the fiber bundle 5, to the imager 9.

The video subsystem further comprises image enhancement system 17. As shown, the image enhancement subsystem 17 comprises A/D converter subsystem 11, a two-dimensional electronic digital image spatial filter 12, and D/A converter 13. The video subsystem 17 further comprises output means 14. In this embodiment, the output means comprises monitor 14 for display of the images. It should be appreciated, however, that other forms of output means are possible. For purposes of this disclosure, the term output means shall refer to any apparatus for receiving the signal representative of the image and further processing it in some manner. It is not necessary that the image be recreated in visual form. Such shall include, for example, an image printer, a video recorder, an image capture board on a computer, or the like. After the image is passed to the imager 9 by the coupling optics 8, the video camera 10 generates an analog signal representative of the image. The same is then passed to the A/D converter subsystem 11 which generates a digital signal responsive to the analog signal. The resultant signal is then passed to filter 12, which functions to substantially remove the high frequency components making up the honeycomb distortion, while leaving the frequency components making up the image substantially unaltered. The resultant filtered signal is then passed to D/A converter 13, which puts the filtered signal back into analog form. The resultant signal is then passed to monitor 14, whereupon the image contained therein is displayed.

The filter 12 is configured to perform a low-pass spatial filtering function in both the X- and Y-directions. To successfully perform its function, the filter 12 should be configured with spatial cutoff frequencies and a frequency response shape, in both the X- and Y-directions, which substantially attenuate the high frequency components making up the honeycomb distortion introduced by the fiber bundle, while leaving the lower frequency components making up the image substantially unattenuated.

These characteristics—cutoff frequencies and frequency response shape—will depend on the parameters of the specific fiber bundle being used, such as the size, shape, density (defined for purposes of this disclosure as the fiber packing density or fibers-per-unit area as opposed to weight-per-unit area), and variability of size of the spaces between the individual fibers making up the bundle, as well as the size, shape, density, and variability of size of the individual fibers themselves. All these parameters impact the spatial frequency components making up the honeycomb distortion. For example, the greater the density of fibers in the bundle, the higher the cutoff frequencies should be.

Therefore, the filter 12 must be matched to these parameters. The preferred filter—an electronic digital filter-can be instantly matched to a given set of parameters. Thus, it overcomes the lack of flexibility inherent in the use of prior art optical elements to perform the filtering function.

It should be appreciated that other embodiments using high pass, band stop, or band pass filters are possible which achieve the same results although in a different way. For example, a high pass filter could be used to isolate the distortion portion of the incident signal, and could then be used to isolate the image portion by subtracting the distortion portion from the incident signal. Or, in the case where the particular combination of endoscope fibers creates a distortion portion of the signal with relatively limited frequency content, a band stop filter could be used to remove those frequencies comprising the distortion portion from the incident signal. Alternatively, in the case where the image portion occupies a limited frequency bandwidth, a band pass filter could be used to isolate that portion. As with the low pass filter embodiment, however, in all these other cases, the principal filter parameters that would be adjusted to improve the image signal are the cutoff frequency (ies) and the frequency response shape.

EXAMPLE

A specific hardware implementation of the subject invention is illustrated in FIG. 3 in which, compared to FIG. 2, like elements are referenced with like identifying numerals. In this implementation, imager 9 is an ICX038 CCD; video camera 10 comprises a CXA1399 correlated double sampler ("CDS"), identified with reference numeral 10a, and a CXD1256 timing generator, identified with reference numeral 10b; and A/D converter subsystem 11 comprises a CXA1508 A/D converter, identified with reference numeral 11a, and a CXD2100 digital processor, identified with reference numeral 11b. The CCD 9, CDS 10a, and A/D converter 11a all receive timing information from the CXD1256 timing generator 10b. The analog picture information as produced by the CDS 10a is passed directly to the input of the A/D converter 11a which produces a 10-bit wide digital output signal. The digital signal is then passed to the digital processor 11b which functions to sort color information from the data descriptive of the image itself. It also forms a digital component output signal known as a Y,U,V signal formatted according to a 4:2:2 format, a standard digital video notation referring to the relative sampling rates of the Y,U,V signals respectively. (The Y component is representative of the luminance of the signal, and is generally defined as a sum of scaled red (R), green (G), and blue (B) primaries. The U and V components are representative of the chrominance of the signal. The U component is generally defined as the difference between the blue primary (B) and the luminance (Y) component; the V component is generally defined as the difference between the red primary (R) and the luminance (Y) component.) The Y,U,V signal is sent to a SAA7186 scale processor, identified with numeral 12a, which is a two-dimensional electronic digital spatial filter of the type discussed previously. A 68HC05 MPU, identified with reference numeral 12b, is used for the storage of at least one parameter descriptive of the fiber bundle of the type discussed previously, i.e. size and shape of the spacings between the fibers, the shape, diameter, and variability of the diameter of the fibers. (A typical fiber bundle should have at least 6,000 fibers, each about 4 μm. in diameter, and all gathered into an overall 460 μm. bundle diameter, in order to provide a useable image). Responsive to the at least one parameter, the MPU sets the cutoff frequencies and frequency response shape in the spatial filter appropriately in order to achieve the object discussed previously, i.e. substantially attenuate the high frequency components making up the honeycomb distortion while leaving the frequency components making up the image substantially unattenuated.

The spatial filter produces a filtered digital signal also in the Y,U,V format. This signal is passed to a SAA7199 encoder, identified with reference numeral 13, which adds necessary synchronization pulses, and converts the resultant signal back to analog form in accordance with any one of several known standards, including a VBS component standard and a separated Y/C standard.

Figure 4:
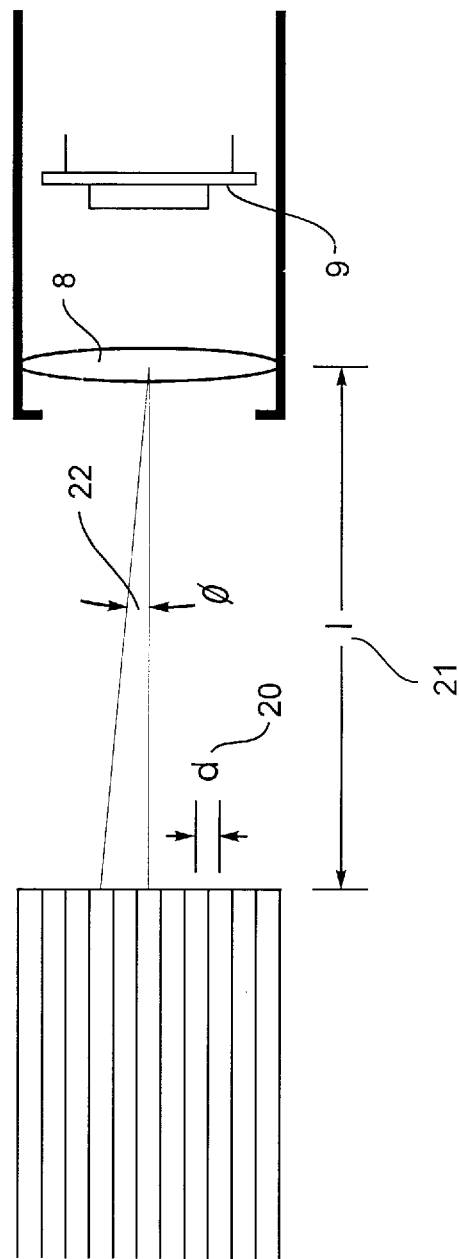
FIG. 4 illustrates an example of how a variable characteristic of the filter is calculated from predetermined parameters of the fiber bundle.

An example of calculating a variable characteristic of the filter—the cutoff frequency in one dimension—from predetermined parameters of the fiber bundle is illustrated in FIG. 4, in which compared to previous figures, like elements are referenced with like identifying numerals. In this example, the predetermined parameters of the fiber bundle include (d), which is the distance between fiber centers, identified with reference numeral 20, (1), which is the distance from the end of the fibers to the coupling optics, identified with reference numeral 21, and (φ), which is the angle between the minimum line pair spacing, identified with reference numeral 22. The highest spatial frequency ($f_h$) of the image at the proximal end of the fibers is then determined by the following formula: $f_h = 1/(2 \arctan d/1)$. In a sample implementation where d=5 μm. and 1=3 mm., the highest spatial frequency will be approximately 5 cycles per degree. The cutoff frequency of the filter should then be set slightly above this value. It should be appreciated that in an actual implementation, the above calculation would need to be performed in two dimensions.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A fiber optic endoscope, comprising:
   an optical fiber bundle having a configuration of fibers and having a distal end and a proximal end for transmitting an image of an object from the distal end to the proximal end, the image having a spatial frequency content of image spatial frequencies, and the bundle, while transmitting the image spatial frequencies, introduces a distortion component relating to the configuration of fibers within the bundle and having a spatial frequency content of distortion spatial frequencies, and the bundle also limits in frequency the image spatial frequencies to provide limited image spatial frequencies which are more distinguishable from the distortion spatial frequencies than the image spatial frequencies;
   imaging means optically coupled to the proximal end of the bundle for receiving the image of the object as transmitted by the bundle and the distortion component, and for producing a signal having an image portion representative of the image of the object as transmitted by the bundle, and a distortion portion representative of the distortion component;
   output means;
   a signal path extending from the imaging means to the output means; and
   a filter, which is configured to substantially distinguish between the distortion and limited image spatial frequencies on the basis of frequency, and allow significant passage of the limited image spatial frequencies to the output means while preventing significant passage of the distortion spatial frequencies without significant degradation of image quality, and which is situated along the signal path to receive the signal having the image portion thereof, and pass a filtered version thereof to the output means such that the signal having the image portion thereof representative of the image of the object as transmitted by the bundle is replaced with the filtered version thereof.

2. The fiber optic endoscope of claim 1 wherein the signal is an analog signal, and the filter is a digital filter, further comprising:
   an analog-to-digital converter situated along the signal path between the imaging means and the filter for converting the analog signal to a digital signal, whereupon the digital signal is input to the filter which produces a filtered digital signal; and
   a digital-to-analog converter situated along the signal path between the filter and the output means for converting the filtered digital signal from the filter to an analog signal having a format determined appropriate for the output means.

3. The fiber optic endoscope of claim 2, further comprising:
   a digital processor situated along the signal path between the analog-to-digital converter and the filter for producing a Y, U, V signal which is input to the filter.

4. The fiber optic endoscope of claim 1 wherein the filter is a two-dimensional spatial filter.

5. The fiber optic endoscope of claim 1 wherein said filter is a low pass filter.

6. The fiber optic endoscope of claim 1 wherein said filter is a band stop filter.

7. The fiber optic endoscope of claim 1 wherein said filter is a band pass filter.

8. The apparatus of claim 1 wherein the filter is an electronic filter.

9. The fiber optic endoscope of claim 1 wherein the filter has a variable frequency characteristic capable of being matched to a predetermined parameter of the bundle responsive to a signal indicative of said predetermined parameter.

10. The fiber optic endoscope of claim 9 further comprising a memory coupled to the filter for storing the predetermined parameter of the bundle.

11. The fiber optic endoscope of claim 9 wherein the variable frequency characteristic is a cutoff frequency.

12. The fiber optic endoscope of claim 9 wherein the variable frequency characteristic is a frequency response shape.

13. A method for reducing a distortion in an image provided by a fiber optic endoscope, comprising:

providing an image of an object to an optical fiber bundle having a configuration of fibers and having a distal end and a proximal end;

the bundle, through transmission of the image from the distal end to the proximal end, introducing a distortion component relating to the configuration of fibers of said bundle and having a spatial frequency content of distortion spatial frequencies, and the bundle also limiting in frequency a spatial frequency content of the image comprising a plurality of image spatial frequencies to obtain a plurality of limited image spatial frequencies which are more distinguishable from the distortion spatial frequencies than the image spatial frequencies;

providing a signal having a portion representative of the image of the object as transmitted by the bundle, and having a distortion portion representative of the distortion component;

providing the signal to a filter configured to substantially distinguish between the limited image spatial frequencies and the distortion spatial frequencies on the basis of frequency, and allow significant passage of the limited image spatial frequencies to an output while preventing significant passage of the distortion spatial frequencies without significant degradation of image quality; and using the filter to filter the signal having the image portion thereof and pass a filtered version thereof to an output such that the signal having the image portion thereof representative of the image of the object as transmitted by the bundle is replaced with the filtered version thereof.

14. The method of claim 13 further comprising:

matching a frequency characteristic of the filter to a predetermined parameter of the bundle responsive to a signal indicative of said predetermined parameter.

15. The method of claim 14 wherein said bundle has a density of individual fibers, and said predetermined parameter is said density.

16. The method of claim 14 wherein said bundle has a shape of individual fibers, and said predetermined parameter is said shape.

17. The method of claim 14 wherein said bundle has a size of individual fibers, and said predetermined parameter is said size.

18. The method of claim 14 wherein said bundle has a variability of size of individual fibers, and said predetermined parameter is said variability.

19. The method of claim 14 wherein said bundle has a size of spaces between individual fibers, and said predetermined parameter is said size.

20. The method of claim 14 wherein said bundle has a shape of spaces between individual fibers, and said predetermined parameter is said shape.

21. The method of claim 14 wherein said bundle has a variability of size of spaces between individual fibers, and said predetermined parameter is said variability.

22. The method of claim 14 wherein said bundle has a density of spaces between individual fibers, and said predetermined parameter is said density.

23. The method of claim 14 wherein said frequency characteristic is a cutoff frequency.

24. The method of claim 14 wherein said frequency characteristic is frequency response shape.

25. A fiber optic endoscope, comprising:

an optical fiber bundle having a configuration of fibers and having a distal end and a proximal end for transmitting an image of an object from the distal end to the proximal end, the image having a spatial frequency content of image spatial frequencies, and the bundle, while transmitting the image spatial frequencies, introduces a distortion component relating to the configuration of fibers of the bundle and having a spatial frequency content of distortion spatial frequencies, and the bundle also limits in frequency the image spatial frequencies to provide limited image spatial frequencies which are more distinguishable from the distortion spatial frequencies than the image spatial frequencies;

imaging means optically coupled to the proximal end of the bundle for receiving the image of the object as transmitted by the bundle and the distortion component, and for producing a signal having an image portion representative of the image of the object as transmitted by the bundle, and a distortion portion representative of the distortion component;

output means;

a signal path extending from the imaging means to the output means; and filter means configured to substantially distinguish between the distortion spatial frequencies and the limited image spatial frequencies on the basis of frequency, and allow significant passage of the limited image spatial frequencies to the output means while preventing significant passage of the distortion spatial frequencies without significant degradation of image quality, and which is situated along the signal path to receive the signal having the image portion thereof, and pass a filtered version thereof to the output means such that the signal having the image portion thereof representative of the image of the object as transmitted by the bundle is replaced by the filtered version thereof.

26. The endoscope of claim 25 wherein the filter means comprises a high pass filter and a means for subtracting from the signal an output of the high pass filter.

27. The apparatus of claim 25 wherein the filter means comprises a low pass filter.

28. The apparatus of claim 25 wherein the filter means comprises a band pass filter.

29. The apparatus of claim 25 wherein the filter means comprises a band stop filter.

30. A method for reducing a distortion in an image provided by a fiber optic endoscope, comprising:

providing an image of an object to an optical fiber bundle having a configuration of fibers and having a distal end and a proximal end;

the bundle, through transmission of the image from the distal end to the proximal end, introducing a distortion component relating to the configuration of fibers of the bundle and having a spatial frequency content of distortion spatial frequencies, and also limiting in frequency a spatial frequency content of the image comprising a plurality of image spatial frequencies to obtain a plurality of limited image spatial frequencies which are more distinguishable from the distortion spatial frequencies than the image spatial frequencies;

providing a signal having a portion representative of the image of the object as transmitted by the bundle, and having a distortion portion representative of the distortion component;

providing the signal to filter means configured to substantially distinguish between the limited image spatial frequencies and the distortion spatial frequencies on the basis of frequency, and allow significant passage of the limited image spatial frequencies to an output while preventing significant passage of the distortion spatial frequencies without significant degradation of image quality; and using the filter means to filter the signal having the image portion thereof and pass a filtered version thereof to the output such that the signal having the image portion thereof representative of the image of the object as transmitted by the bundle is replaced by the filtered version thereof.

31. The method of claim 30 wherein the filter means comprises a high pass filter and a means for subtracting from the signal an output of the high pass filter.

32. The method of claim 30 wherein the filter means comprises a low pass filter.

33. The method of claim 30 wherein the filter means comprises an electronic filter.

34. A fiber optic endoscope, comprising:

an optical fiber bundle having a configuration of fibers and having a distal end and a proximal end for transmitting an image of an object from the distal end to the proximal end, the image having a spatial frequency content of image spatial frequencies wherein the bundle introduces a distortion into the image relating to the configuration of fibers of the bundle, and having a spatial frequency of distortion spatial frequencies, and the bundle also limits in frequency the image spatial frequencies to provide limited image spatial frequencies which are more distinguishable from the distortion spatial frequencies than the image spatial frequencies;

imaging means optically coupled to the proximal end of the bundle for receiving the image of the object as transmitted by the bundle, and for producing a signal having an image portion representative of the image of the object as transmitted by the bundle;

output means;

a signal path extending from the imager to the output means; and filter means situated along the signal path for receiving the signal having the image portion, removing without significant degradation of image quality at least some of said distortion therefrom to produce a modified signal, and passing the modified signal to the output means.

35. The endoscope of claim 34 wherein the filter means is a low pass filter.

36. The endoscope of claim 34 wherein the filter means comprises a high pass filter and a means for subtracting from the signal an output of the high pass filter.

37. A method for reducing a distortion in an image provided by a fiber optic endoscope, comprising:

providing an image of an object to an optical fiber bundle having a configuration of fibers and having a distal end and a proximal end the image having a spatial frequency content of image spatial frequencies;

transmitting the image from the distal end to the proximal end;

providing information representative at least in part of the image of the object as transmitted by the bundle;

introducing into the image a distortion relating to the configuration of fibers of the bundle, and having a spatial frequency content of distortion spatial frequencies, and the bundle also limits in frequency the image spatial frequencies to provide limited image spatial frequencies which are more distinguishable from the distortion spatial frequencies than the image spatial frequencies;

removing without significant degradation of image quality from the information representative at least in part of the image of the object as transmitted by the bundle at least some of said distortion to produce modified information; and passing the modified information to an output.

38. The method of claim 37 wherein the removing step comprises filtering at least some distortion from the information.

39. The method of claim 38 wherein the removing step comprises subtracting at least some distortion from the information.

* * * * *